United States Patent
Bae et al.

(10) Patent No.: US 8,915,079 B2
(45) Date of Patent: Dec. 23, 2014

(54) BRAKE ACTUATOR UNIT

(75) Inventors: Seung Hyup Bae, Chungnam (KR); Hong Ki Kim, Gyeonggi-Do (KR); Chang Bok Ko, Kyungki-Do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 874 days.

(21) Appl. No.: 13/092,436

(22) Filed: Apr. 22, 2011

(65) Prior Publication Data
US 2011/0259004 A1 Oct. 27, 2011

(30) Foreign Application Priority Data

Apr. 22, 2010 (KR) .................. 10-2010-0037394

(51) Int. Cl.
*B60T 7/04* (2006.01)
*B60T 13/14* (2006.01)

(52) U.S. Cl.
CPC ............. *B60T 111/20* (2013.01); *B60T 13/143* (2013.01)
USPC .............................................. 60/534; 60/580

(58) Field of Classification Search
CPC .............................. B60T 7/042; B60T 11/203
USPC .................................................... 60/534, 580
See application file for complete search history.

(56) References Cited

U.S. PATENT DOCUMENTS

| | | | |
|---|---|---|---|
| 2,124,363 A * | 7/1938 | Bertrand | ........................ 60/580 |
| 4,489,989 A | 12/1984 | Belart et al. | |
| 4,604,870 A | 8/1986 | Bach et al. | |
| 4,875,338 A | 10/1989 | Leiber | |
| 5,448,888 A | 9/1995 | Castel | |
| 5,778,673 A * | 7/1998 | Poertzgen et al. | .............. 60/582 |

FOREIGN PATENT DOCUMENTS

| | | |
|---|---|---|
| DE | 10 2006 012 221 B3 | 8/2007 |
| DE | 10 2006 036 311 A1 | 2/2008 |
| DE | 10 2008 012 847 A1 | 9/2009 |

OTHER PUBLICATIONS

German Office Action issued in German Patent Application No. 10 2011 018 266.7 dated Nov. 12, 2013.
Chinese Office Action, w/ English translation thereof, issued in Chinese Patent Application No. CN 201110102029.7 dated Jul. 25, 2013.

* cited by examiner

*Primary Examiner* — F. Daniel Lopez
(74) *Attorney, Agent, or Firm* — McDermott Will & Emery LLP (57) ABSTRACT

A brake actuator unit capable of improving the pedal feeling. The brake actuator unit includes a housing, a master cylinder connected to one end of the housing and provided therein with first and second pistons arranged in parallel to each other, an operating fluid reservoir coupled to an upper portion of the master cylinder to store operating fluid, a simulator accommodated in the master cylinder to provide repulsive force to a pedal, an input shaft moving back and forth according to an operation of the pedal, a control plunger slidably moving back and forth together with the input shaft, first and second output shafts positioned corresponding to first and second pistons to move back and forth together with the control plunger, and a pedal displacement sensor connected to the input shaft.

6 Claims, 9 Drawing Sheets

BRAKE ACTUATOR UNIT

This application claims the benefit of Korean Patent Application No. 10-2010-0037394 filed on Apr. 22, 2010, in the Korean Intellectual Property Office, the disclosure of which is incorporated herein by reference.

BACKGROUND

1. Field

The disclosure relates to a brake actuator unit. More particularly, the disclosure relates to a brake actuator unit capable of improving the pedal feeling.

2. Description of the Related Art

In general, an active hydraulic booster (AHB) includes a brake actuator unit. When a driver steps on a brake pedal, the brake actuator unit detects displacement of the brake pedal from a pedal displacement sensor and an electronic control unit (ECU) calculates wheel pressure to control pressure of each wheel through an independent feedback control.

In such a brake actuator unit, if the driver steps on the brake pedal, an input shaft is moved and the ECU detects the movement of the input shaft, so working fluid stored in an accumulator is transferred to the master cylinder to generate the liquid pressure in the master cylinder. However, if the pressure of the master cylinder is changed during the regenerative braking operation, the pressure variation may be directly transferred to the brake pedal, thereby deteriorating the pedal feeling. In addition, a simulator chamber must be additionally installed to improve the pedal feeling, so the size of the brake actuator unit is unnecessarily increased.

SUMMARY

Accordingly, it is an aspect of the disclosure to provide a brake actuator unit capable of improving the brake pedal feeling.

It is another aspect of the disclosure to provide a brake actuator unit capable of reducing the size thereof by omitting an additional simulation chamber for pedal simulation.

Additional aspects and/or advantages of the disclosure will be set forth in part in the description which follows and, in part, will be apparent from the description, or may be learned by practice of the disclosure.

The foregoing and/or other aspects of the disclosure are achieved by providing a brake actuator unit including a housing, a master cylinder connected to one end of the housing and provided therein with first and second pistons arranged in parallel to each other, an operating fluid reservoir coupled to an upper portion of the master cylinder to store operating fluid, a simulator accommodated in the master cylinder to provide repulsive force to a pedal, an input shaft moving back and forth according to an operation of the pedal, a control plunger slidably moving back and forth together with the input shaft, first and second output shafts positioned corresponding to first and second pistons to move back and forth together with the control plunger, and a pedal displacement sensor connected to the input shaft.

According to the disclosure, the simulator includes first and second simulators arranged in parallel to each other.

According to the disclosure, the first and second simulators include first and second simulator pistons, first and second simulator springs applying elastic force to the first and second simulator pistons, and first and second retainers supporting the first and second simulator springs, respectively.

According to the disclosure, the brake actuator unit further includes a return spring disposed between the master cylinder and the control plunger.

According to the disclosure, the first and second output shafts are provided with first and second output shaft caps, respectively.

According to the disclosure, the first and second output shaft caps are coupled with first and second body caps, respectively.

As described above, according to one aspect of the disclosure, the brake actuator unit can improve the brake pedal feeling and can reduce the size thereof by omitting an additional simulation chamber for pedal simulation.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Reference will now be made in detail to the embodiments of the disclosure, examples of which are illustrated in the accompanying drawings, wherein like reference numerals refer to the like elements. The embodiments are described below to explain the disclosure by referring to the figures.

Figure 1:
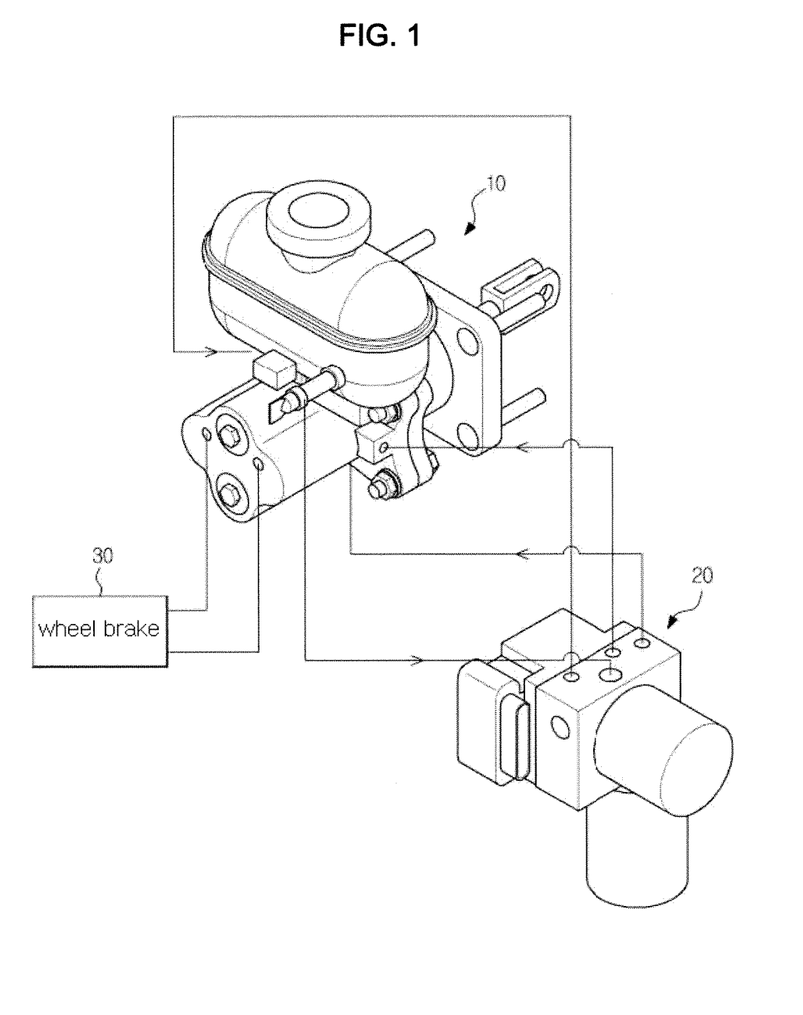
FIG. 1 is a view schematically showing a brake actuator unit and a hydraulic pressure generator according to the disclosure.
Figure 2:
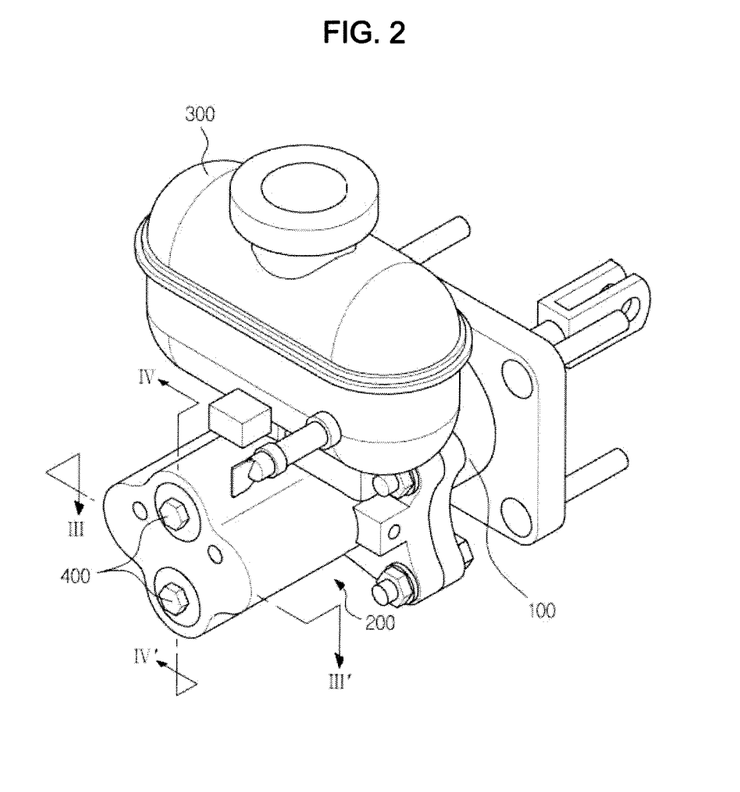
FIG. 2 is a perspective view showing a brake actuator unit illustrated in FIG. 1.
Figure 3:
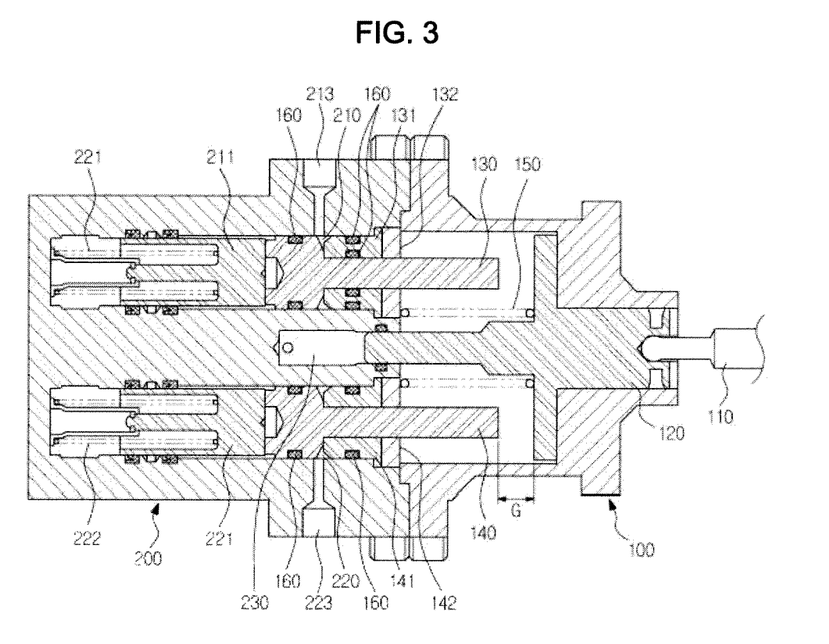
FIG. 3 is a sectional view taken along line III-III' of FIG. 2.
Figure 4:
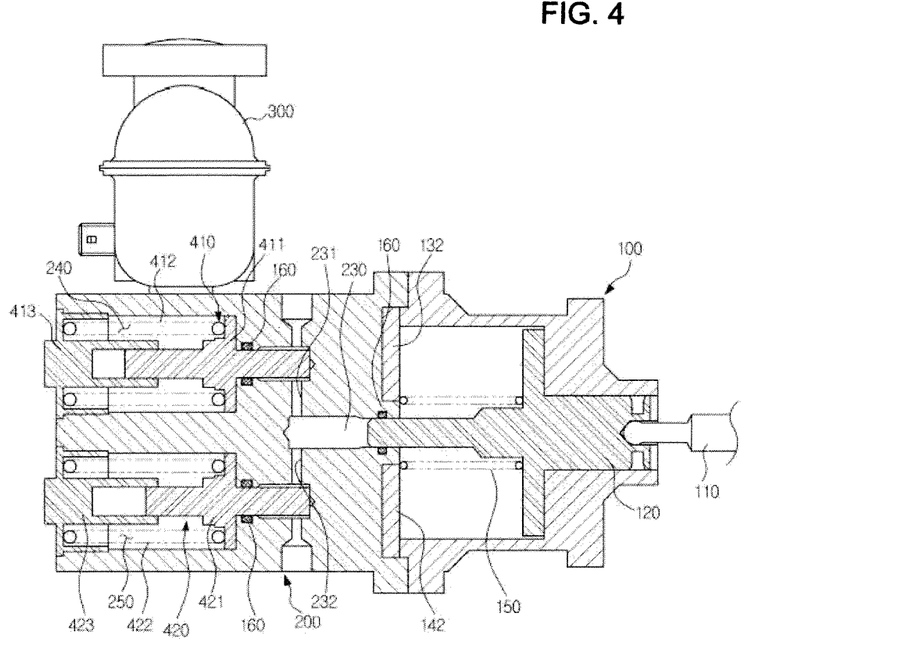
FIG. 4 is a sectional view taken along line IV-IV' of FIG. 2.

FIG. 1 is a view schematically showing a brake actuator unit and a hydraulic pressure generator according to the disclosure, FIG. 2 is a perspective view showing a brake actuator unit illustrated in FIG. 1, FIG. 3 is a sectional view taken along line III-III' of FIG. 2, and FIG. 4 is a sectional view taken along line IV-IV' of FIG. 2.

As shown in FIGS. 1 to 4, the brake actuator unit 10 includes a housing 100, a master cylinder 200 connected to one end of the housing 100 and having first and second pressure chambers 210 and 220 arranged in parallel to each other, an operating fluid reservoir 300 coupled to an upper portion of the master cylinder 200 to store operating fluid, and a simulator 400 accommodated in the master cylinder 200 to provide repulsive force to a pedal. Meanwhile, a hydraulic pressure generator 20 is connected to the operating fluid reservoir 300 of the brake actuator unit 10 to generate hydraulic pressure, and a wheel brake 30 is connected to the master cylinder 200 of the brake actuator unit 10.

The housing 100 supports various components installed therein. An input shaft 110, a control plunger 120, a first output shaft 130, a second output shaft 140 and a return spring 150 are accommodated in the housing 100.

In detail, the housing 100 is provided therein with the input shaft 110 moving back and forth in cooperation with a brake pedal, the control plunger 120 slidably moving back and forth together with the input shaft 110, the first output shaft 130 moving back and forth together with the control plunger 120, and the second output shaft 140 moving back and forth together with the first output shaft 130. Meanwhile, a pedal displacement sensor is connected to the input shaft 110 to measure the displacement of the input shaft 110.

The pedal displacement sensor is connected to the input shaft 110 and measures the displacement of the input shaft 110 to transmit the displacement of the input shaft 110 to the ECU. The ECU measures the displacement of the input shaft 110 and controls a valve provided in the hydraulic pressure generator 20. The operating fluid reservoir 300 supplies the operating fluid to the hydraulic pressure generator 20.

The hydraulic pressure generator 20 compresses the working fluid supplied from the operating fluid reservoir 300 and supplies the compressed working fluid to the first and second pressure chambers 210 and 220, which are provided in the master cylinder 200, through first and second oil ports 213 and 223.

The first pressure chamber 210 receives high-pressure working fluid through the first oil port 213. One end of the first output shaft 130 is accommodated in the first pressure chamber 210. The first output shaft 130 is moved by the high-pressure working fluid.

The second pressure chamber 220 receives high-pressure working fluid through the second oil port 223. One end of the second output shaft 140 is accommodated in the second pressure chamber 220. The second output shaft 140 is moved by the high-pressure working fluid.

Meanwhile, first and second output shaft caps 131 and 141 are provided at the first and second output shafts 130 and 140, respectively. The first and second output shaft caps 131 and 141 are coupled with first and second body caps 132 and 142, respectively. The first and second output shaft caps 131 and 141 and the first and second body caps 132 and 142 may seal the first and second pressure chambers 210 and 220, so that the first and second output shafts 130 and 140 can move in the forward direction by the working fluid.

Hydraulic pressure is generated in the master cylinder 200 due to the movement of first and second pistons 211 and 221 engaged with the first and second output shafts 130 and 140, respectively, and the hydraulic pressure generated in the master cylinder 200 is transferred to the wheel brake of a vehicle for the braking operation. The first and second pistons 211 and 221 correspond to the first and second output shafts 130 and 140 and are arranged in the first and second pressure chambers 210 and 220, respectively, in parallel to each other.

Meanwhile, the first and second pistons 211 and 221 are provided with first and second springs 212 and 222, respectively. Elastic force is accumulated in the first and second springs 212 and 222 as the first and second pistons 211 and 221 are compressed. When the pushing force of the first and second output shafts 130 and 140 with respect to the first and second pistons 211 and 221 is weaker than the elastic force accumulated in the first and second springs 212 and 222, the first and second pistons 211 and 221 may return to their initial positions by the elastic force.

The simulator 400 is accommodated in the master cylinder 200 to provide repulsive force to the brake pedal. If the driver steps on the brake pedal, the input shaft 110 moves so that the control plunger 120 advances to the left. As the control plunger 120 advances, the working fluid stored in an oil chamber 230 is compressed. The compressed working fluid is transferred to the simulator 400 through first and second oil paths 231 and 232.

The simulator 400 includes first and second simulators 410 and 420 arranged in parallel to each other in connection with the first and second oil paths 231 and 232.

The first simulator 410 includes a first simulator piston 411, a first simulator spring 412 supplying elastic force to the first simulator piston 411, and a first retainer 413 supporting the first simulator spring 412. The first simulator piston 411, the first simulator spring 412 and the first retainer 413 are accommodated in a first simulation chamber 240 provided in the master cylinder 200.

The second simulator 420 includes a second simulator piston 421, a second simulator spring 422 supplying elastic force to the second simulator piston 421, and a second retainer 423 supporting the second simulator spring 422. The second simulator piston 421, the second simulator spring 422 and the second retainer 423 are accommodated in a second simulation chamber 250 provided in the master cylinder 200.

Therefore, the working fluid supplied to the first and second simulators 410 and 420 through the first and second oil fluid paths 231 and 232 may push the first and second simulator pistons 411 and 421, so that the first and second simulator pistons 411 and 421 move in the first and second simulation chambers 240 and 250, respectively.

Thus, the first and second simulator pistons 411 and 421 push the first and second simulator springs 412 and 422, respectively, and the elastic force is accumulated in the first and second simulator springs 412 and 422. If the hydraulic pressure pushing the first and second simulator pistons 411 and 421 has become weaker than the elastic force, the first and second simulator pistons 411 and 421 are moved in the opposite direction by the elastic force accumulated in the first and second simulator springs 412 and 422.

As the first and second simulator pistons 411 and 421 are moved in the opposite direction, the working fluid supplied to the first and second simulators 410 and 420 is supplied to the oil chamber 230 through the first and second oil paths 231 and 232 and the control plunger 120 is moved to the right by the working fluid. As the control plunger 120 is moved to the right, the input shaft 110 is moved to the right so that the repulsive force is provided to the brake pedal.

Meanwhile, the return spring 150 is coupled between the control plunger 120 and the master cylinder 200 to return the control plunger 120 to its initial position. The return spring 150 is elastically compressed as the control plunger 120 advances according to the forward movement of the input shaft 110 caused by the operation of the brake pedal. The compressed elastic force provides the repulsive force to the control plunger 120 so that the control plunger 120 is moved back to its initial position.

Therefore, the pedal feeling may be improved during the normal braking operation due to the three springs of the first simulator spring 412, the second simulator spring 422, and the return spring 150.

A gap G is formed between one end of the control plunger 120 and one end of the first and second output shafts 130 and 140. Due to the gap G, the pressure generated from the first output shafts 130 and 140 during the braking operation may not be transferred to the input shaft 110 through the control plunger 120. Thus, the pressure generated from the first output shafts 130 and 140 during the braking operation may not be transferred to the brake pedal due to the gap G.

Meanwhile, elastic sealing members 160 are provided around the control plunger 120, the first output shaft 130, the second output shaft 140, the first output shaft cap 131, the second output shaft cap 141, the first piston 211 and the second piston 221 to prevent the leakage of the working fluid and infiltration of impurities.

Hereinafter, the normal braking operation and the emergency braking operation of the brake actuator unit according to the disclosure will be described.

Figure 5:
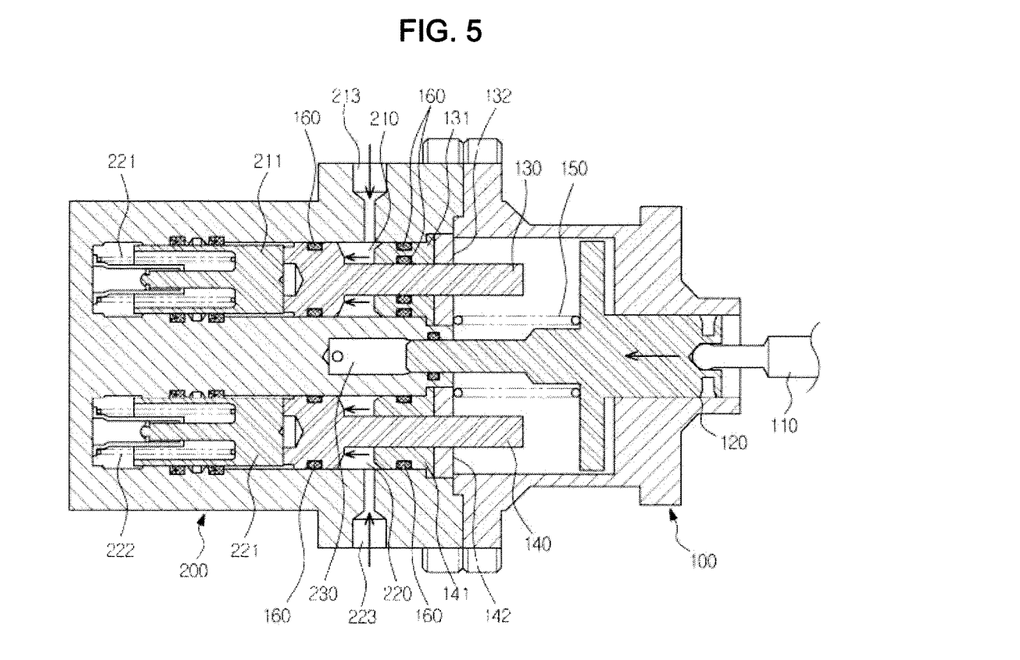
FIG. 5 is a sectional view showing the operational state of first and second output shafts under the normal braking operation.

First, the normal braking operation of the brake actuator unit according to the disclosure will be described with reference to FIGS. 5 to 7. FIG. 5 is a sectional view showing the operational state of the first and second output shafts under the normal braking operation, FIG. 6 is a sectional view showing the operational state of the first and second simulator pistons under the normal braking operation, and FIG. 7 is a graph showing the relation between pedal force and pedal displacement.

Figure 6:
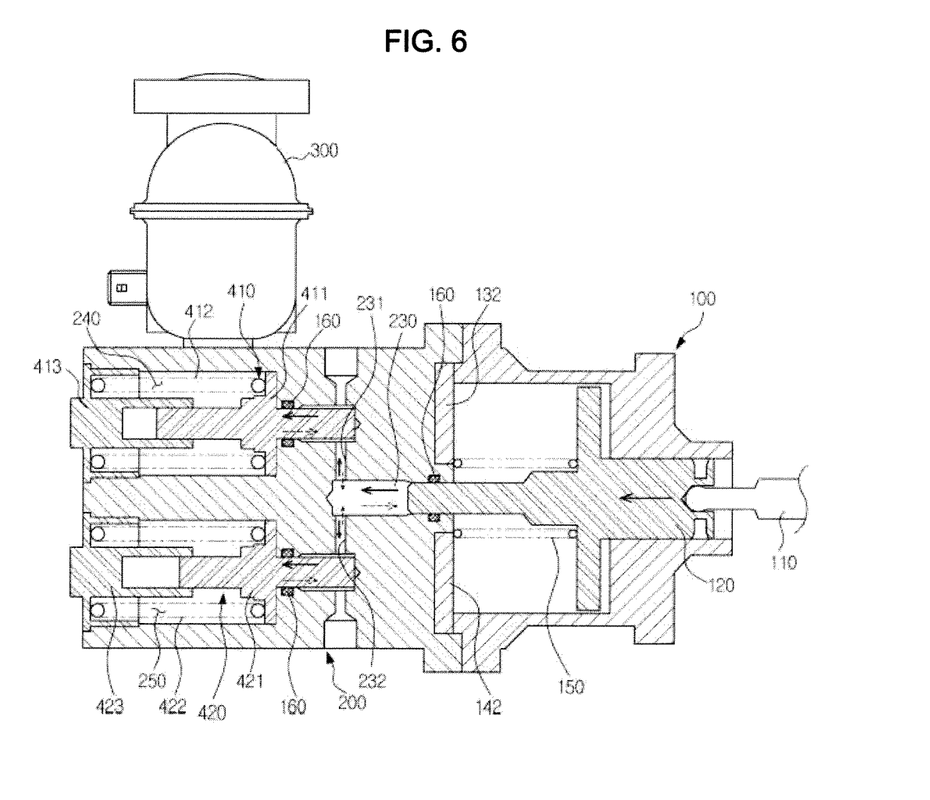
FIG. 6 is a sectional view showing the operational state of first and second simulator pistons under the normal braking operation.
Figure 7:
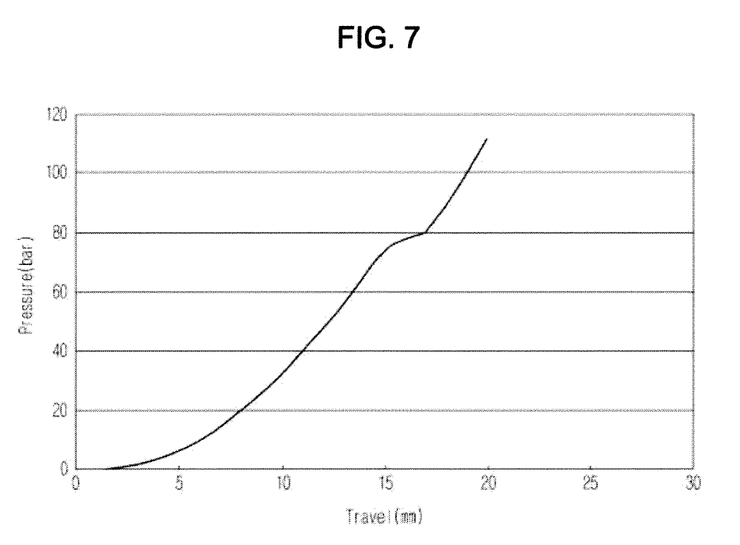
FIG. 7 is a graph showing the relation between pedal force and pedal displacement.

As shown in FIGS. 5 to 7, if the driver steps on the brake pedal, the input shaft 110 connected to the brake pedal advances to the left in the axial direction and the control plunger 120 advances to the left.

At this time, the movement of the input shaft 110 is detected by the pedal displacement sensor and the pedal displacement sensor transmits the detecting signal to the ECU. Then, the ECU operates the hydraulic pump to generate the braking pressure, so that the high-pressure working fluid is stored in the accumulator. The high-pressure working fluid is supplied to the first and second pressure chambers 210 and 220 through the first and second oil ports 213 and 223 provided in the master cylinder 200, thereby pushing the first and second output shafts 130 and 140.

The first and second output shafts 130 and 140 push the first and second pistons 211 and 221 so that the working fluid stored in the master cylinder 200 is compressed. Thus, the high-pressure working fluid is generated. The high-pressure working fluid is transferred to the wheel brake, so that the braking force is generated.

In addition, if the driver releases the brake pedal under the normal braking operation of the brake actuator unit 10, the control plunger 120 that has been advanced by the brake pedal force may move back due to the elastic force of the first simulator spring 412, the second simulator spring 422 and the return spring 150. Thus, the input shaft 110 is moved back by the control plunger 120, so that the brake pedal returns to its initial position.

At this time, the brake actuator unit 10 according to the disclosure changes the operation area, the mounting load and the spring constant of the first and second simulator springs 412 and 422. Thus, as shown in FIG. 7, the repulsive force is increased in the form of the secondary curve, which is similar to the displacement curve of the normal brake actuator unit, other than the primary straight line, so that the pedal feeling can be improved.

Figure 8:
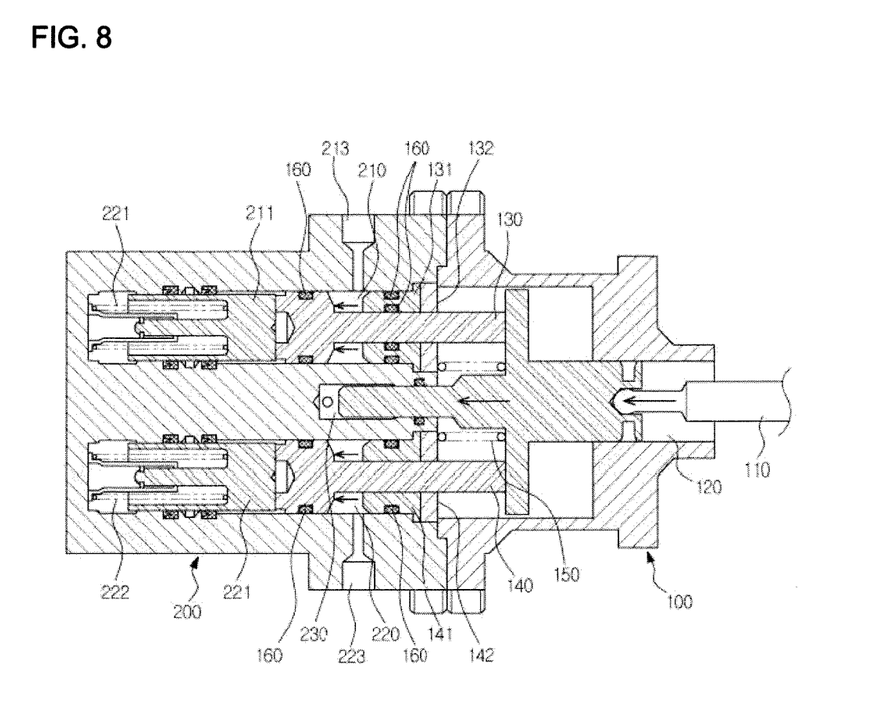
FIG. 8 is a sectional view showing the operational state of first and second output shafts under the emergency braking operation.

Hereinafter, the emergency braking operation of the brake actuator unit according to the disclosure will be described with reference to FIGS. 8 and 9. FIG. 8 is a sectional view showing the operational state of the first and second output shafts under the emergency braking operation and FIG. 9 is a sectional view showing the operational state of the first and second simulator pistons under the emergency braking operation.

Figure 9:
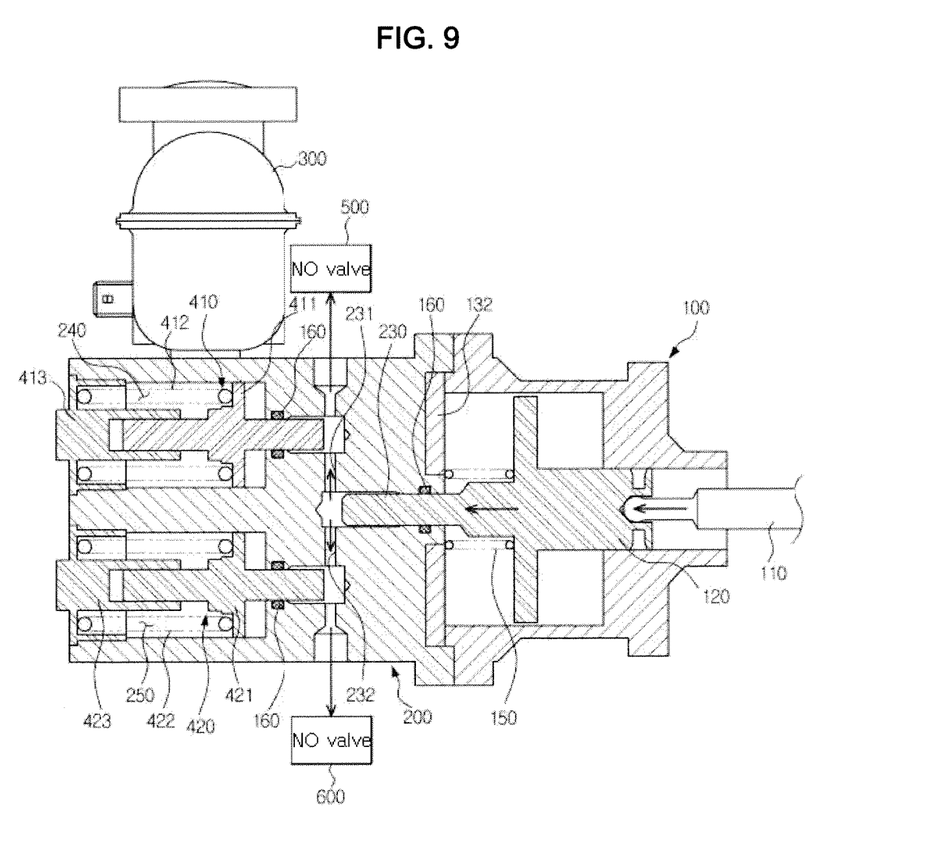
FIG. 9 is a sectional view showing the operational state of first and second simulator pistons under the emergency braking operation.

As shown in FIGS. 8 and 9, if the driver steps on the brake pedal, the control plunger 120 advances by the input shaft 110. The control plunger 120 moves beyond the gap G formed between the control plunger 120 and the first and second output shafts 130 and 140, thereby directly pushing the first and second output shafts 130 and 140. Thus, the first and second pistons 211 and 221 are pushed by the first and second output shafts 130 and 140 so that the working fluid stored in the master cylinder 200 is compressed. The compressed working fluid is transferred to the wheel brake, thereby generating the braking force.

At this time, since the fluid is discharged through NO (normally open) valves 500 and 600, the pressure is not generated in the first and second simulation chambers 240 and 250 and the first and second simulator springs 412 and 422 are not operated. Thus, the control plunger 120 is not subject to additional loads except for the load of the return spring 150, so higher liquid pressure can be generated.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A brake actuator unit comprising:
   a housing;
   a master cylinder connected to one end of the housing and provided therein with first and second pistons arranged in parallel to each other;
   an operating fluid reservoir coupled to an upper portion of the master cylinder to store operating fluid;
   a simulator accommodated in the master cylinder to provide repulsive force to a pedal;
   an input shaft moving back and forth according to an operation of the pedal;
   a control plunger slidably moving back and forth together with the input shaft;
   first and second output shafts positioned corresponding to first and second pistons; and
   a pedal displacement sensor connected to the input shaft,
   wherein the control plunger is fluidly coupled to the simulator, and
   wherein a gap is arranged between the control plunger and the first and second output shafts such that the first and second output shafts move back and forth together with the control plunger when the control plunger has traversed the gap.

2. The brake actuator unit of claim 1, wherein the simulator includes first and second simulators arranged in parallel to each other.

3. The brake actuator unit of claim 2, wherein the first and second simulators include first and second simulator pistons, first and second simulator springs applying elastic force to the first and second simulator pistons, and first and second retainers supporting the first and second simulator springs, respectively.

4. The brake actuator unit of claim 1, further comprising a return spring disposed between the master cylinder and the control plunger.

5. The brake actuator unit of claim 1, wherein the first and second output shafts are provided with first and second output shaft caps, respectively.

6. The brake actuator unit of claim 5, wherein the first and second output shaft caps are coupled with first and second body caps, respectively.

* * * * *